United States Patent
Kuehl et al.

(10) Patent No.: US 7,398,310 B1
(45) Date of Patent: Jul. 8, 2008

(54) METHOD AND SYSTEM FOR TRACKING ENTITIES IN A COMPUTER NETWORK

(75) Inventors: Kirby L. Kuehl, San Ramon, CA (US); Erik J. Ginorio, Livermore, CA (US); Adam James Baldwin, Fairfax, VA (US)

(73) Assignee: Cisco Technology Inc., San Jose, CA (US)

( * ) Notice: Subject to any disclaimer, the term of this patent is extended or adjusted under 35 U.S.C. 154(b) by 935 days.

(21) Appl. No.: 10/600,856

(22) Filed: Jun. 19, 2003

(51) Int. Cl.
*G06F 15/16* (2006.01)
(52) U.S. Cl. ...................................... 709/224
(58) Field of Classification Search ................. 709/224; 726/23
See application file for complete search history.

(56) References Cited

U.S. PATENT DOCUMENTS

| | | | | |
|---|---|---|---|---|
| 5,596,723 A | * | 1/1997 | Romohr | 709/222 |
| 6,122,639 A | * | 9/2000 | Babu et al. | 707/103 R |
| 6,986,161 B2 | * | 1/2006 | Billhartz | 726/23 |
| 7,146,418 B2 | * | 12/2006 | Bahl | 709/224 |
| 7,194,554 B1 | * | 3/2007 | Short et al. | 709/246 |
| 2003/0217289 A1 | * | 11/2003 | Ammon et al. | 713/201 |

* cited by examiner

*Primary Examiner*—Jason Cardone
*Assistant Examiner*—Chirag Patel
(74) *Attorney, Agent, or Firm*—Stolowitz Ford Cowger LLP

(57) ABSTRACT

A method and system for tracking entities in a computer network. A method includes receiving node information related to a node coupled to a computer network. The method further includes determining whether an entity associated with the node has been previously identified in the computer network. If the entity has been previously identified in the computer network, the node information is linked to an entry for the entity in the database. If the entity has not been previously identified in the computer network, a new entry is created in the database, and the node information is linked to the new entry.

27 Claims, 8 Drawing Sheets

METHOD AND SYSTEM FOR TRACKING ENTITIES IN A COMPUTER NETWORK

FIELD OF THE INVENTION

The present invention relates to the field of computer networks. Specifically, embodiments of the present invention relate to a method and system for tracking entities in a computer network.

BACKGROUND ART

Many systems exist to provide some measure of security in a computer network. For example, network intrusion detection systems (NIDS) use sophisticated detection techniques to monitor network traffic on a specified segment of a network. One drawback with NIDS is that they are reactive instead of proactive. For example, NIDS perform a rule-based analysis of data packets by looking for signatures in the data packets. A signature is a sequence of data that indicate a security risk. Upon detecting a security risk, NIDS generate an alarm that identifies the source and destination nodes involved in the security risk. The nodes are identified by host and destination addresses in the headers of the analyzed data packets. Unfortunately, the alarm identifies the nodes by Internet Protocol (IP) address, which is often dynamic. That is, those nodes can have a different IP address at a later point in time. Therefore, the alarm report must be acted upon before the nodes' IP addresses change, which is not always practical. For example, remediation efforts typically lag the reception of the alarm report.

Moreover, unfortunately the NIDS system generates too many false alarms because it has no mechanism for determining if the signature that caused the alarm will actually cause a security problem in the system. That is, while typical NIDS know that a potential security risk has arisen because a specific signature was detected, they do not know whether the nodes are actually at risk. For example, the nodes may have a security patch in place unbeknownst to the NIDS.

One conventional way to reduce false alarms is to use adaptive scanning techniques. Adaptive scanning techniques validate NIDS events by determining if a destination node is actually threatened by the signature detected by the NIDS. For example, the destination node may have in place a security patch and thus is not actually at risk. Adaptive scanning techniques also rate legitimate attacks by assigning a priority to them. However, although conventional adaptive scanning techniques actively probe a network for vulnerabilities, they react to the NIDS event and hence are not proactive. Moreover, because they trigger based on a NIDS event, adaptive scanning techniques are based on IP addresses. This is acceptable for networks with devices with statically assigned IP addresses. However, another approach is desirable for networks with computer systems that do not have a static IP address.

Computer systems without a static IP address provide security challenges for the conventional methods discussed above. Mobile computer systems are especially problematic. However, even a non-mobile computer system that has a dynamically assigned IP address can present security problems for conventional methods. Remediation, such as updating a new virus protection program on all computer systems in a network, is a particular problem. However, the security challenge exists in situations other than remediation. As an example of the unique security challenge, when a laptop physically moves in a network, it will generate multiple alarms in a NIDS due to its multiple IP addresses. Even a computer system that does not move, but that uses a dynamically assigned (DHCP) IP address will cause multiple alarms in a NIDS. A conventional NIDS cannot correlate these multiple alarms to a single a computer system. Hence, remediation efforts are very difficult. Moreover, security issues other than remediation are negatively impacted by changing identifiers of computer systems.

Therefore, it would be advantageous to provide a method and system that facilitates remediation efforts in a computer network. Such a method and system would advantageously be proactive. It would be further advantageous if the method and system is able to determine that an entity that physically moves in a network is the same entity that was previously recognized elsewhere in the network. It would be still further advantageous to correlate multiple alarms having different IP addresses associated therewith as being related to the same computer system.

SUMMARY OF THE INVENTION

Embodiments of the present invention provide a method and system for tracking entities in a computer network. Embodiments of the present invention do so proactively. Embodiments of the present invention determine that an entity that physically moves in a network is the same entity that was previously recognized elsewhere in the network. Embodiments of the present invention track an entity even though the entity has a different IP address than previously associated with the entity, thus embodiments correlate multiple alarms having different IP addresses associated therewith as being related to the same computer system.

A method and system for tracking entities in a computer network is disclosed. In one embodiment, a method comprises receiving node information for a node coupled to a computer network. The method further comprises determining whether an entity associated with the node has been previously identified in the computer network. If the entity has been previously identified in the computer network, the node information is linked to an entry for the entity in the database. If the entity has not been previously identified in the computer network, a new entry is created in the database, and the node information is linked to the new entry.

Another embodiment provides for a system for tracking entities in a computer network. The system comprises means for receiving node information for a node coupled to a computer network. The system also comprises means for determining whether an entity associated with the node has been previously identified in the computer network. The system also comprises means for linking the node information to an existing database entry for the entity if the entity has been previously identified in the computer network. The system also comprises means for creating a new database entry for the entity if the node has not been previously identified in the computer network, and linking the node information to the new database entry for the entity.

These and other advantages of the present invention will no doubt become obvious to those of ordinary skill in the art after having read the following detailed description of the preferred embodiments which are illustrated in the various drawing figures.

DETAILED DESCRIPTION OF THE INVENTION

Figure 1:
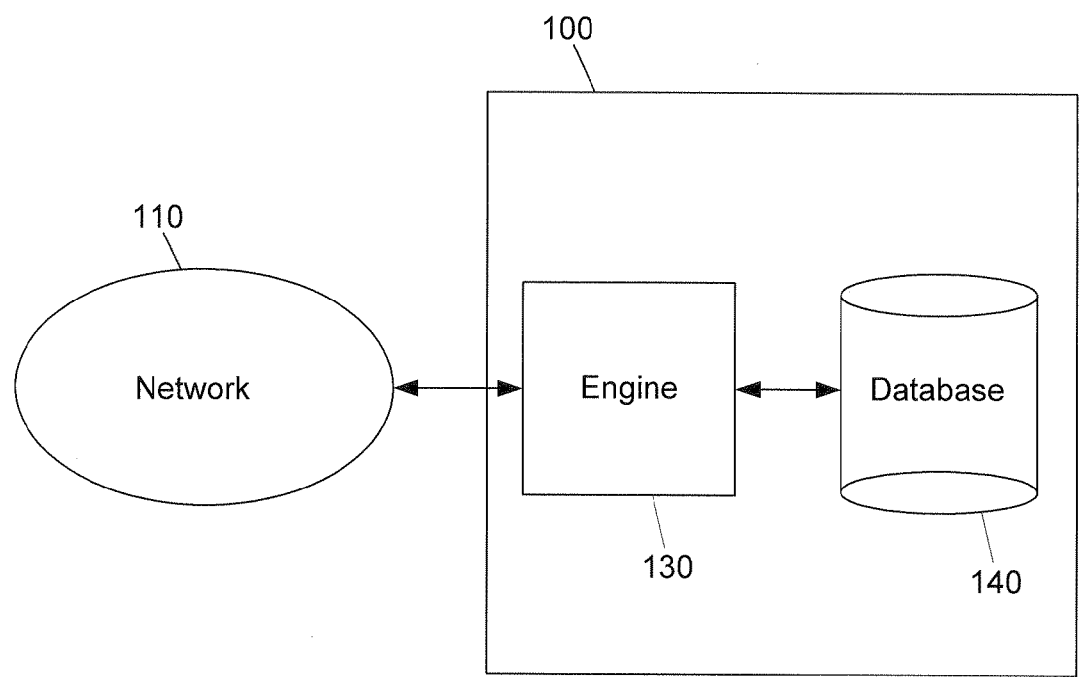
FIG. 1 is a diagram of a system for tracking entities in a computer network, according to an embodiment of the present invention.

In the following detailed description of the present invention, a method and system for tracking entities in a computer network, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "linking" or "identifying" or "computing" or "receiving" or "calculating" or "determining" or "creating" or "returning" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Tracking Entities in a Computer Network

In contrast to the conventional techniques described in the background art section, embodiments of the present invention are able to track an entity in a computer network. In various embodiments, the entity is a computer system, a user, or a computer system running a particular configuration. The configuration may be, for example, an operating system, running services, patch level or general configuration. For example, if tracking is based on the operating system, then a computer system is considered a different entity when running a different operating system. The entity that is tracked is not limited to these examples, however.

FIG. 1 is a diagram showing a system 100 for tracking entities in a computer network 110, according to an embodiment of the present invention. The system 100 comprises an engine 130 and a database 140. The engine 130 is able to receive node information from nodes in the computer network 110. For the purposes of the present application, a node is defined as some device having a connection to the network 110. In some embodiments, the connection to the network is an IP connection during a given period of time. Each node has associated therewith an entity. Examples of entities are computer systems, users, and even special configurations of a computer system. However, the present invention is not limited to these examples of entities. The present invention identifies an entity for each node and links the node information to previously received node information related to that entity. In this fashion, an entity is tracked in the computer network 110.

Still referring to FIG. 1, the engine 130 stores the newly received node information in the database 140. For the purposes of the present application, the stored node information will be referred to as a node entry. Thus, a node entry is a snapshot in time of the node information related to one entity. The database 140 also includes entity entries, which contain information related to all node entries for that entity. This allows an entity to be tracked in the computer network 110. The engine 130 analyzes the received node information in light of various information already in the database 140. The engine 130 determines if an entity entry exists in the database 140 for an entity associated with the node from which the information relates. The engine 130 links the newly received node information to the entity entry if one already exists. Otherwise, the engine 130 creates a new entity entry in the database 140 and links the newly received node information to the newly created entity entry.

Figure 2:
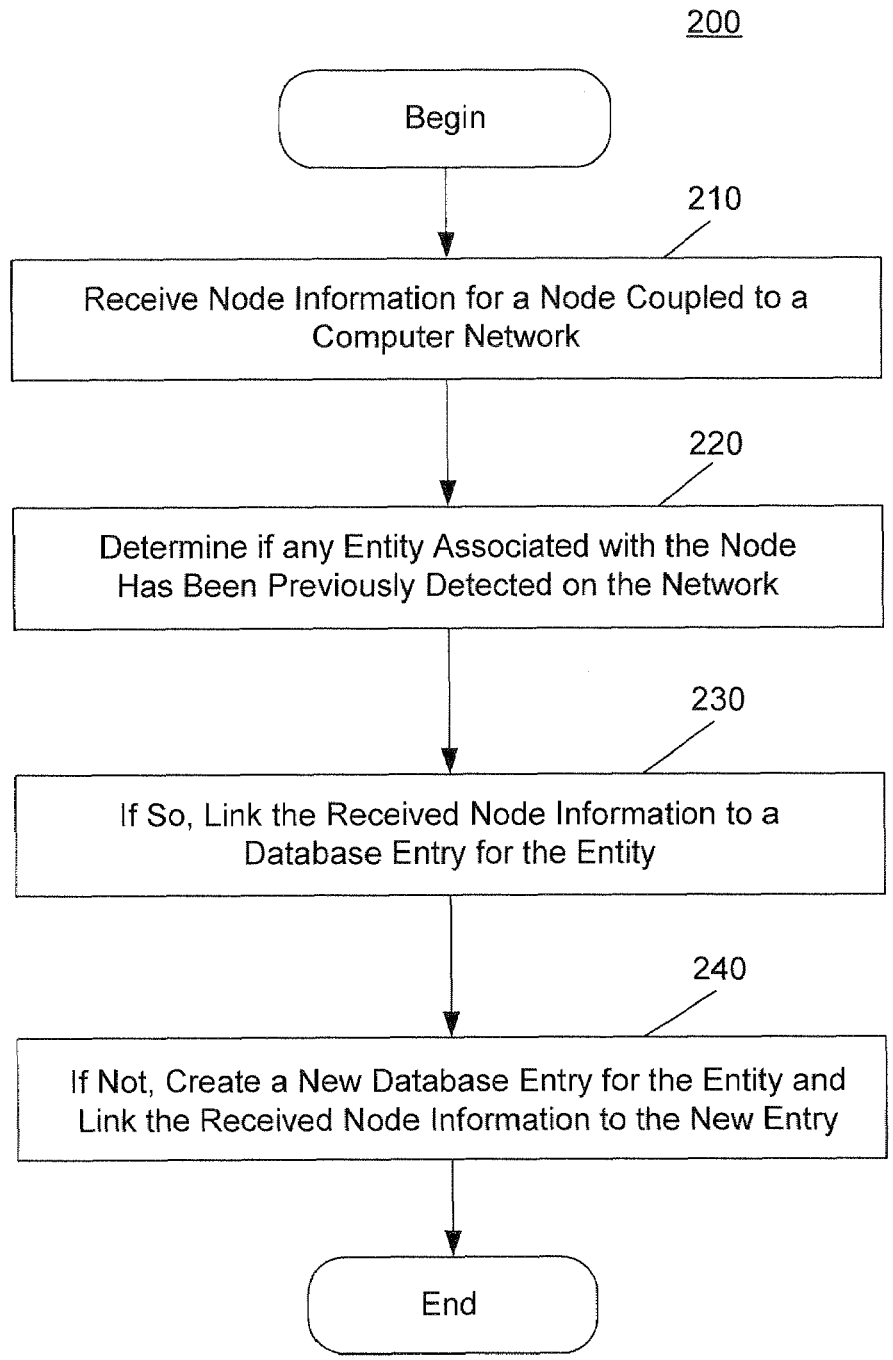
FIG. 2 is a flowchart illustrating a process for tracking entities in a computer network, according to an embodiment of the present invention.

FIG. 2 is a flowchart illustrating a process 200 for tracking entities in a computer network, in accordance with one embodiment of the present invention. In step 210, node information is received for a node coupled to a computer network. The information received for a single node is analyzed in steps 220-240. Then, the process 200 repeats for other nodes in the network.

The process 200 determines whether an entity associated with the node has been previously identified in the computer network, in step 220. For example, a database is searched to determine if it already contains an entry for this entity. The information for each node is analyzed to uniquely identify an entity associated with the node. For example, if the entity is a user, the node information may contain a globally unique identifier (GUID) such as a user security identifier (SID) that has a match in the databases. If the entity is a computer system, then the computer system is uniquely identified. Exemplary information that is used to uniquely identify a computer system comprises, but is not limited to, a serial number, security identifiers, globally unique identifiers, MAC addresses, a computer name, a domain name, an operating system, file versions, and MD5 hashes of files. By using one or more types of the received node information, an entity is uniquely identified. An identification process using such information will be discussed more fully below.

If the entity has been previously identified in the computer network, then in step 230, at least a portion of the newly received information for the node is linked to the entity. For example, if a database entry already exits for the entity, then at least a portion of the newly received information for the node is linked to the information already in the database for this entity. For example, the information that is used to identify an entity is stored in the entity entry. Other security information can be stored in the entity entry as well.

If the entity has not been previously identified in the computer network, then in step 240, a new database entry is created for the entity. Moreover, the received node information is linked to the new database entry for said entity. In this fashion, an entity is tracked in the computer network. This allows tracking of a computer that physically moves, as well as tracking of a computer system that has a dynamically assigned IP address. The conventional techniques discussed in the background art sections are not able to perform such tracking. It will be understood that the tracking is not limited to a computer system. For example, a user or other entity can be tracked.

Figure 3:
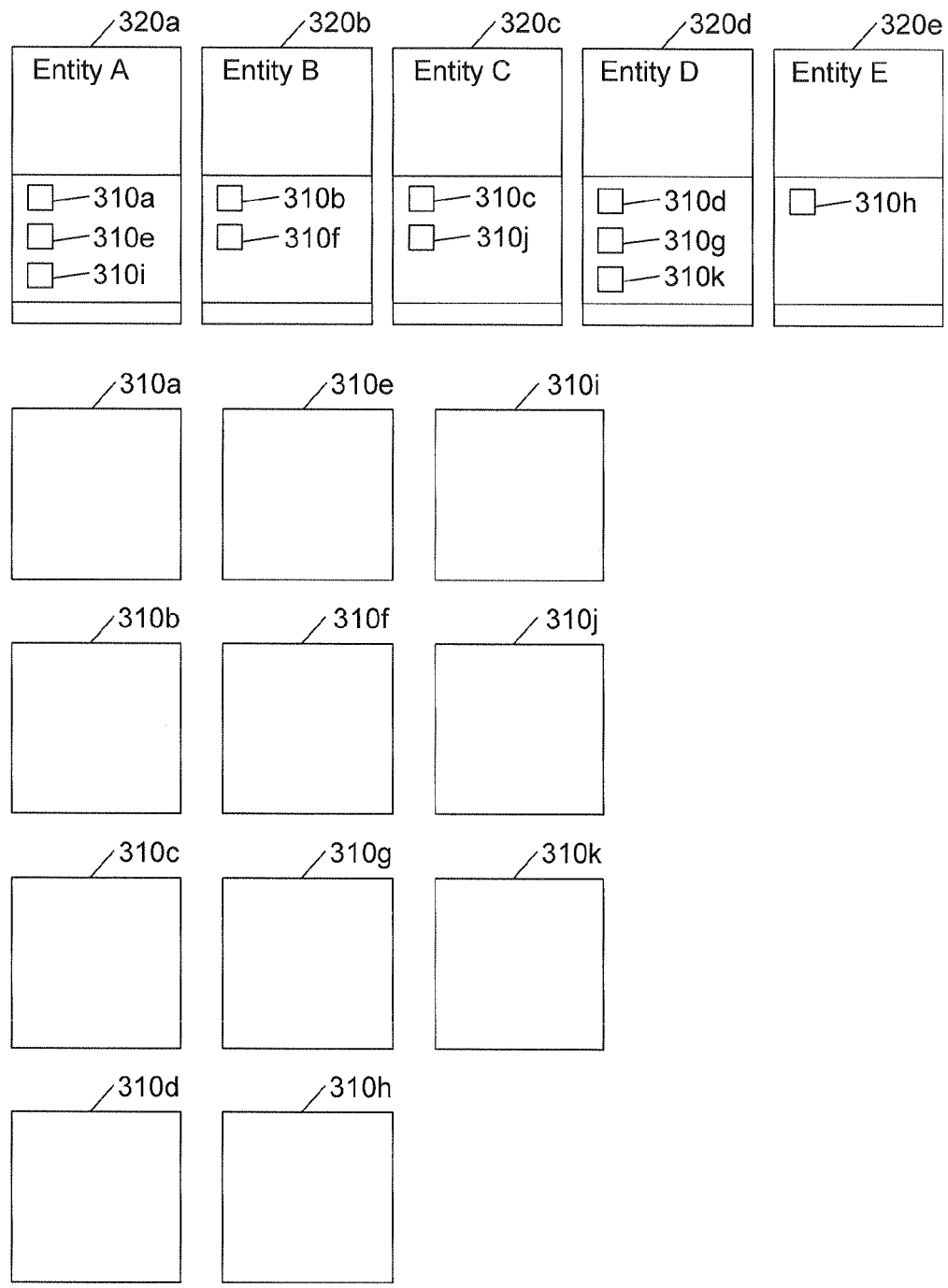
FIG. 3 is a block diagram representing data for tracking entities in a computer network, according to an embodiment of the present invention.

FIG. 3 illustrates linking between the node information and the entity entries. In this embodiment, the information is received from each node periodically. FIG. 3 illustrates a state after three such periods. For purposes of discussion, the boxes in FIG. 3 will be referred to as entries. There are node entries 310 and entity entries 320. Each entity entry 320 at the top pertains to a particular entity being tracked. Thus, five entities are being tracked in this example. Each time a new entity is found in the network, a new entity entry 320 is created. The node entries 310 correspond to the information that is received at a given point in time at a given node. Each node entry 310 is linked to one entity entry 320. However, a single entity entry 320 can be linked to any number of node entries 310. Those of ordinary skill in the art will appreciate that FIG. 3 represents just one way of linking the node information to the entities being tracked and that many other configurations are possible.

For purposes of illustration, the node information is grouped in columns based on when it was received. Thus, in the first period, four nodes were on the network. Assuming the database was empty at that time, a new entity entry 320 would be created for each entity. Thus, entity entries 320a-320d were created during the first period. Each of these entity entries 320a-d references one of the node entries 310a-d from the first period. That is, entity entry 320a has a reference to node entry 310a, entity entry 320b has a reference to node entry 310b, entity entry 320c has a reference to node entry 310c, entity entry 320d has a reference to node entry 310d. Furthermore, each entity entry 320 has stored in it some subset of the node entry information.

Referring still to FIG. 3, in the second period, four nodes were in the network. An algorithm determines that node information for the node entry 310e is associated with entity A. Therefore, node entry 310e is linked to entity entry 320a. Entity entry 320b has a reference to node entry 310f and entity entry 320d has a reference to node entry 310g, linking these node entries 310e-g to those respective entity entries 320a, 320b, and 320d. Node entry 310h represents the first time that entity E has appeared in the network. Hence, a new entity entry 320e is created for it.

Referring now to the third period in FIG. 3, information for three nodes was received from the network in the third period, as represented by node entries 310i-k. None of these represents a new entity, so each of these node entries 310i-k is linked to an entity that was previously found on the network, in these case entities A, C, and D, respectively.

Figure 4:
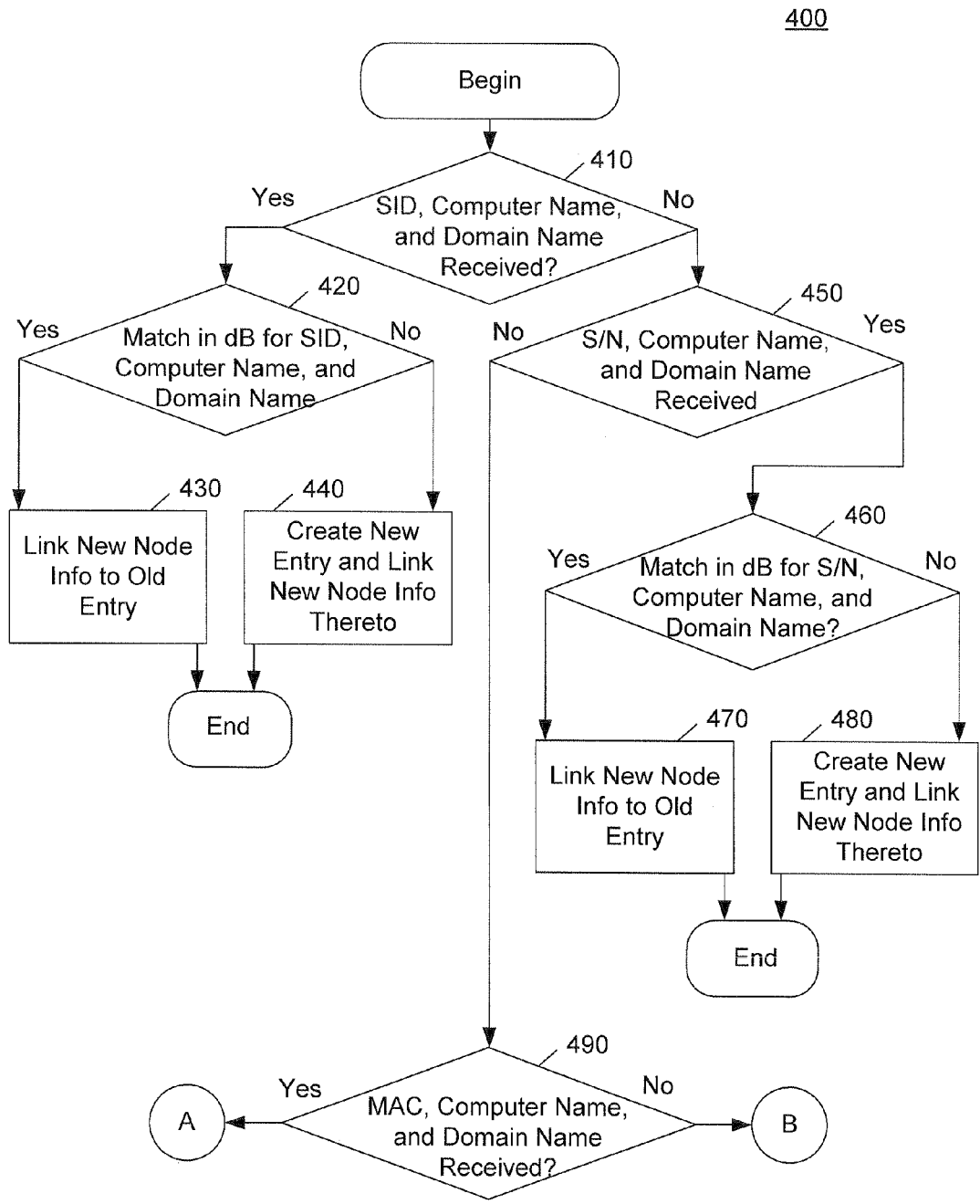
FIG. 4, FIG. 5, and FIG. 6 are flowcharts illustrating a process for tracking entities in a computer network, according to an embodiment of the present invention.
Figure 5:
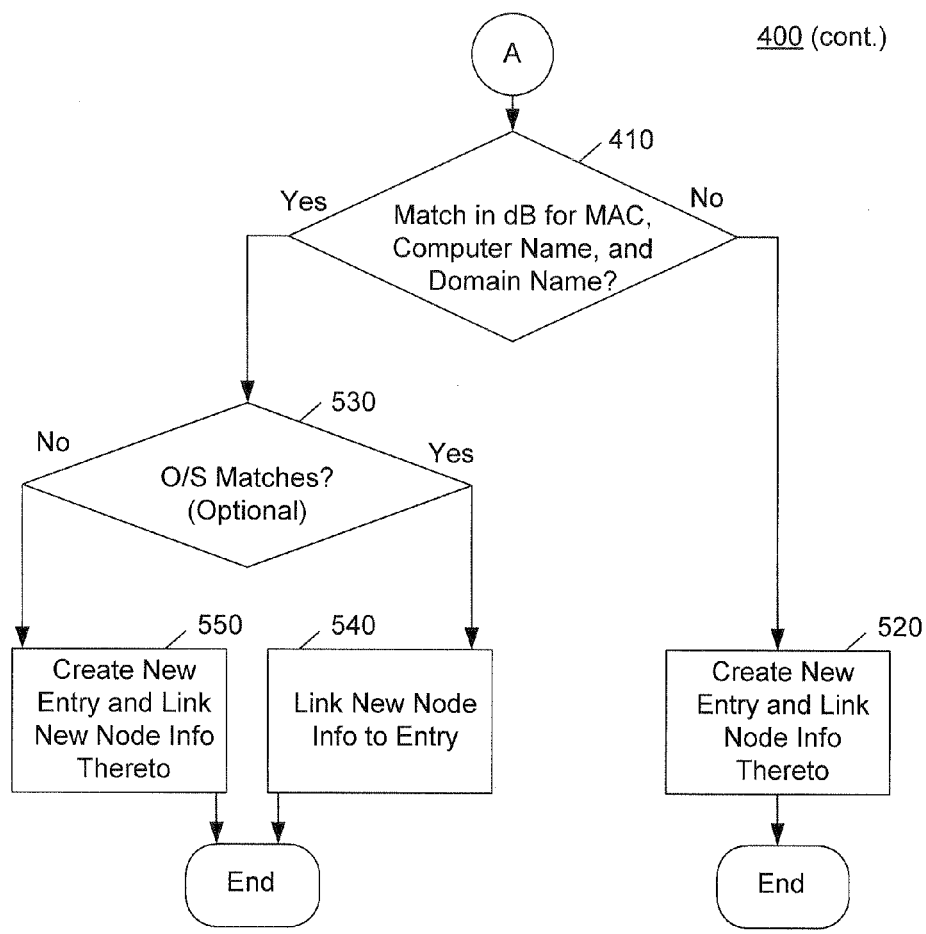
Figure 6:
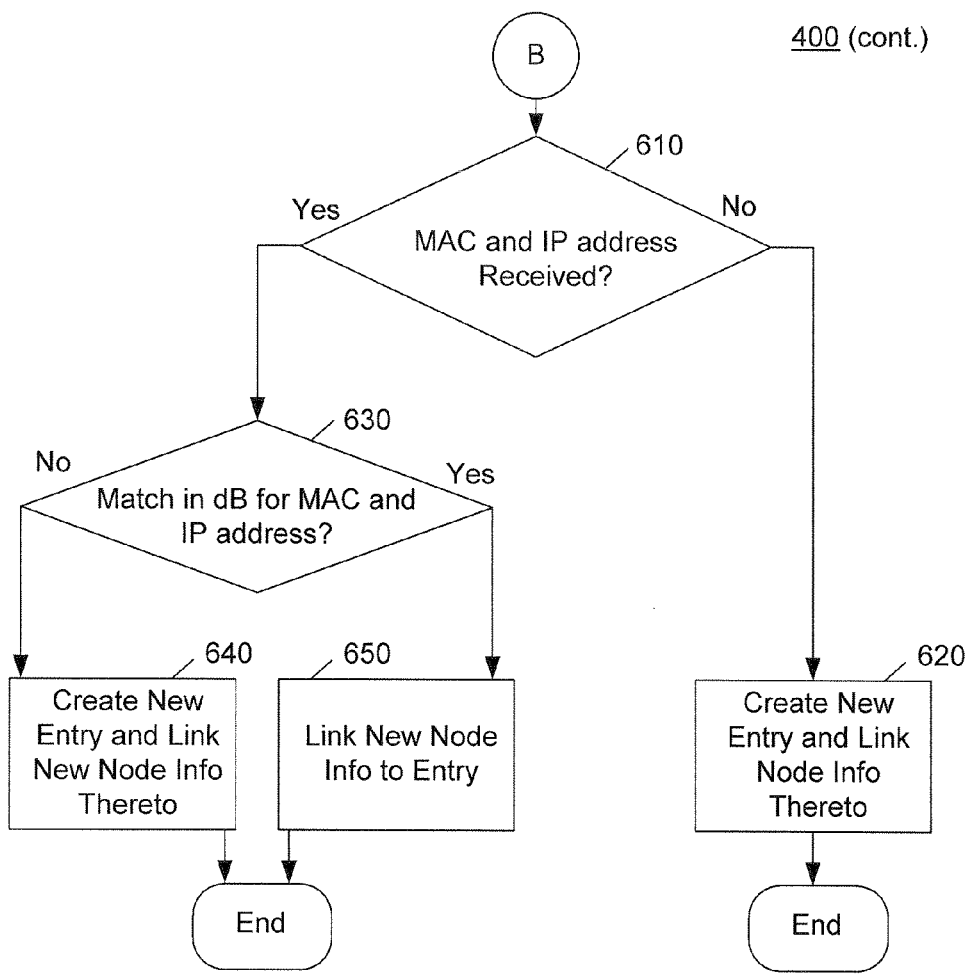

FIGS. 4-6 are flowcharts illustrating a process 400 of linking newly received node information with entities being tracked. In this example, the entity being tracked is a computer system running a particular operating system. That is, a computer system is considered to be multiple unique entities if it runs multiple operating systems. The present invention is well suited to other definitions of an entity.

Referring now to FIG. 4, in step 410 a GUID, a computer name, and a domain name are received, if possible. In one embodiment, the GUID is a SID. The SID is a property of a Windows operating system and can be used to identify a unique operating system installation, a unique user ID, or a unique group ID. Thus, if a computer system boots with multiple Windows operating systems, it will have multiple corresponding unique SIDs. A unique SID is given to a computer system by a security authority when that entity joins the network, that is, when an account or group is created. Another unique SID is given to a user or group by the security authority at account or group creation time. However, the user SID is not used in process 400. That is, the process 400 uses the computer system SID as opposed to the user SID to identify the entity being tracked. However, if a user were the entity being tracked, the user SID could be used in a similar process. SIDs are unique for all time, and security authorities never issue the same SID twice or reuse SIDs from deleted accounts. Thus, SIDs are unique within the scope of the account or group they identify. Therefore, assuming that a computer system has not been cloned, the SID is able to uniquely identify a computer system within the scope of the account or group to which it belongs. However, if a computer system has been cloned, there will be duplicate SIDs in the computer network. That is, if a byte-for-byte copy is performed from the hard drive of a first computer system to the hard drive of a second computer system, the two computer systems will have the same SID.

Referring now to step 420 of FIG. 4, if a GUID, computer name and domain name are received, then a database is searched to determine if a match exists for the GUID, computer name and domain name in an existing entity entry. This check for a computer name and domain name is performed to handle the possibility of duplicate GUIDs due to a cloned hard drive. In one embodiment, the computer name that is checked is a NetBIOS (Network Basic Input Output System) name. In one embodiment, the domain name that is checked is a Microsoft Active Directory name. If there is a match for the GUID, computer name and domain name, then the newly received node information is linked to the entity entry having the matching GUID, computer name and domain name, in step 430. The process 400 then ends.

If step 420 determined that there is not a match in the databases for the GUID, computer name and domain name, then in step 440, a new entity entry is created and the newly received node information is linked to the newly created entity entry. The process 400 then ends.

Returning now to step 420, if the database does not have a match for the received GUID, computer name and domain name, then in step 440, a new entity entry is created and the newly received node information is linked to the newly created entity entry. The process 400 then ends.

If the process 400 determined, in step 410, that a GUID, computer name and domain name were not received, then the process 400 determines, in step 450, if a serial number, computer name and domain name were received in the node information. The serial number refers to a unique serial number of the entity being tracked. In the present embodiment, this is the serial number for the hardware of the computer system and is obtained by a Web-Based Enterprise Management (WBEM) call to the system BIOS (basic input output system). The WBEM call may be, but is not limited to, a Microsoft specific implementation of WBEM known as Windows Management Instrumentation (WMI).

If serial number, computer name and domain name were received, then in step 460 the process 400 searches the database to determine if there is match for the serial number, computer name and domain name in any of the entity entries. The check for a computer name and domain name is performed to handle the possibility of duplicate serial numbers due to a cloned hard drive. In one embodiment, the computer name that is checked is a NetBIOS (Network Basic Input Output System) name. In one embodiment, the domain name that is checked is a Microsoft Active Directory name. If there is a match for the serial number, computer name and domain name, then the newly received node information is linked to the entity entry having the matching serial number, in step 470. The process 400 then ends.

If step 460 determined that there is not a match for the serial number, computer name, and domain name in the database, then in step 480, a new entity entry is created and the newly received node information is linked to the newly created entity entry. The process 400 then ends.

Referring again to step 450, if a serial number, computer name and domain name were not received, then the process 400 determines, in step 490, whether a MAC address, computer name, and domain name were received in the node information. If so, the process 400 proceeds to "A" and continues as shown in FIG. 5. If a MAC address, computer name, and domain name were not received, then the process 400 proceeds to "B" and continues as shown in FIG. 6.

A MAC address is a unique identifier of a computer interface. However, the computer interface can be moved to another computer system. Furthermore, a computer system can have multiple network interfaces, and hence multiple MAC addresses can be associated therewith. Thus, a MAC address is not a unique identifier of a host computer system. For example, a docking station has a unique MAC address; however, multiple host computer systems can use the docking station. Therefore, the MAC address of the docking station does not uniquely identify any host computer system. As another example, a Personal Computer Memory Card International Association (PCMCIA) card has a unique MAC address. However, the PCMCIA card can be physically moved from one computer system to another. Thus, information in addition to the MAC address is used to uniquely identify the host computer system at the node currently being analyzed. Referring now to step 510 of FIG. 5, the process 400 checks to see of there is a match for the MAC address in any entity entries in the database. There can be multiple entity entries that have this MAC address because the computer interface that has this MAC address can move from computer system to computer system. Thus, additional tests are performed to uniquely identifier the entity.

Continuing on with the discussion of process 400, if a MAC address, computer name, and domain name were received in the node information, the process 400 proceeds to FIG. 5. In step 510, it is determined if there is a match for the MAC address, computer name, and domain name in at least one entity entry. If the node under investigation is running either a Windows operating system or a UNIX® operating system running SAMBA, then the computer name is a NetBIOS (Network Basic Input Output System) name. SAMBA is an SMB (server message block) daemon for the UNIX® environment. No two computers with the same NetBIOS name can be on the same network at the same time. However, after a first computer system leaves the network, a second computer system can take the first computer system's NetBIOS name. Therefore, a NetBIOS name is not unique. However, when combined with test in the rest of process 400, a unique identification of the computer system can be made. The computer name is not limited to being a NetBIOS name.

If there is not a match for the MAC address, computer name, and domain name in any of the entity entries, then in step 520 a new entity entry is created in the database, and the newly received node information is linked to the newly created entity entry. The domain name is an NT domain name or an Active Directory name in a Windows system, in one embodiment. If the domain name does not match any domain name in the entry having the MAC address and the computer name, then a note is made to physically check the node under investigation to determine if the computer system was physically moved to a different domain. Thus, an assumption is made that this node is likely to be the same computer system as the process 400 just matched to a given entity entry, only moved to a new domain. However, the physical check is performed at a convenient time to verify this assumption. The entity entry contains sufficient information to locate the node. The process 400 then ends.

If however, there is a match for the MAC address, computer name, and domain name, then in optional step 530 the process 400 checks to see if there is a match for the operating system being run at the node under investigation. This test looks for an operating system match in the entity entry that had the matching MAC address, matching computer name, and matching domain name. If the operating system matches with one in the entity entry, then in step 540 the newly received node information is linked to the entity entry that had the matching MAC address, matching computer name, and matching domain name.

If the operating system does not match with one in the entity entry, then in step 550, a new entity entry is created in the database, and the newly received node information is linked to the newly created entity entry. This situation pertains to a multiple operating system device, for example, a computer system that boots with one out of multiple possible operating systems. Such a computer system is tracked separately for each operating system because remediation efforts should be directed to each operating system separately. The process 400 then ends.

Referring again to step 490 of FIG. 4, if a MAC address and IP address were not received, then the process 400 proceeds to "B" and continues with the steps in FIG. 6. In step 610, the process 400 checks to see of there is a MAC address and an IP address was received. If not, then a new entity entry is created, and the newly received node information is linked to the newly created entity entry in step 620. The process 400 then ends.

Computer systems and network devices not running a Windows Operating System or a UNIX operating system running SAMBA will not have the uniquely identifying characteristics such as a GUID/SID, Serial Number, NetBIOS computer name and NetBIOS domain name. In this case, if a MAC address and IP address were received, then step 630 determines if there is a match for the MAC address and IP address in any of the entity entries in the database. A MAC Address, which is a Layer 2 hardware address can uniquely identify its corresponding Layer 3 IP Address and is usually obtained via an Address Resolution Protocol (ARP) or Simple Network Management (SNMP) request.

If there is not a match for the MAC address and IP address, then in step 640 a new entity entry is created in the database, and the newly received node information is linked to the newly created entity entry. The process 400 then ends.

If however, there is a match for the MAC address and IP address in at least one of the entity entries, then the information may be linked to the matching entry. However, optionally, a new entry can be created, as in step 640. Further, in any case in which process 400 does not determined a unique identification algorithmically, a new node is created. This may be the case, for example, if the only information received is an IP address and a MAC address.

Figure 7A:
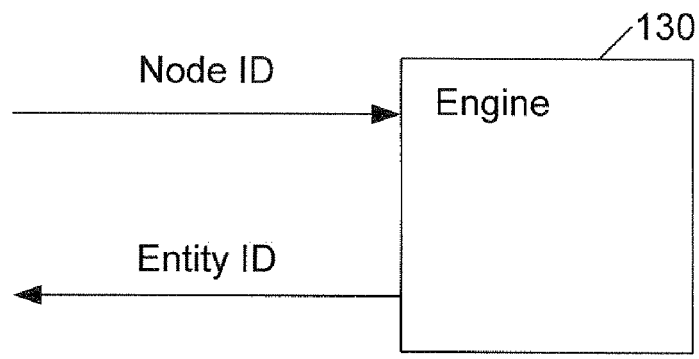
FIGS. 7A-7C are block diagrams representing data flow in tracking entities in a computer network, according to embodiments of the present invention.
Figure 7B:
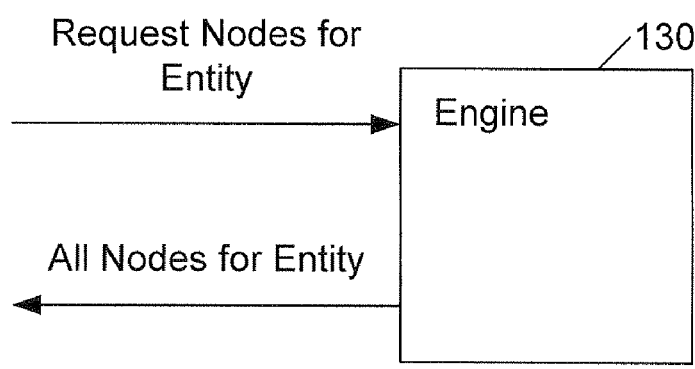
Figure 7:
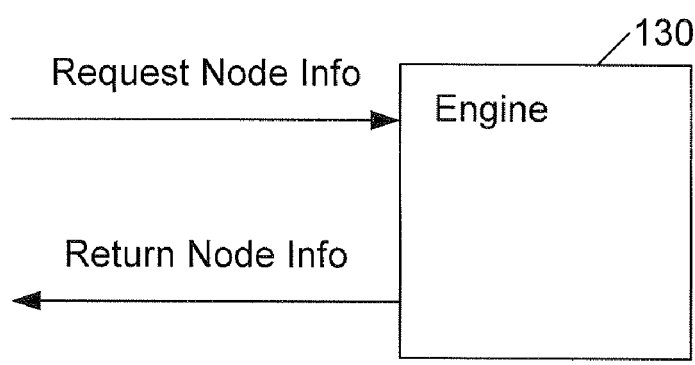

FIGS. 7A-7C are block diagrams representing various data flows in tracking entities in a computer network, according to various embodiments of the present invention. In FIG. 7A, a request supplies an identifier of a node. The engine 130 responds to the request by returning an identifier of the entity associated with the node. In FIG. 7B, a request is made for a list of all the node entries that exist in the database pertaining to an entity. The request includes the entity identifier from the example of FIG. 7A. The engine 130 responds to the request by returning identifiers for all the nodes associated with the entity. In FIG. 7C, a request is made for information pertaining to one of the nodes that was identified in the response in FIG. 7B. The engine 130 responds to the request by returning all the information for that node. Thus, the combination of FIGS. 7A-7C allows a requestor who has an identifier of a single node or an entity to obtain all of the node information for all of the nodes that are related to the entity.

Embodiments of the present invention provide many benefits. One embodiment makes available a list all computer systems on the network that are running a specified process. Thus, a system administrator can request for and receive a list of all computer systems in the network that are running a specified version of a web server, what computer systems have a security patch in place, etc. Remediation efforts can then be efficiently and accurately directed to those computer systems in need of remediation. However, the present invention is not limited to remediation efforts.

Figure 8:
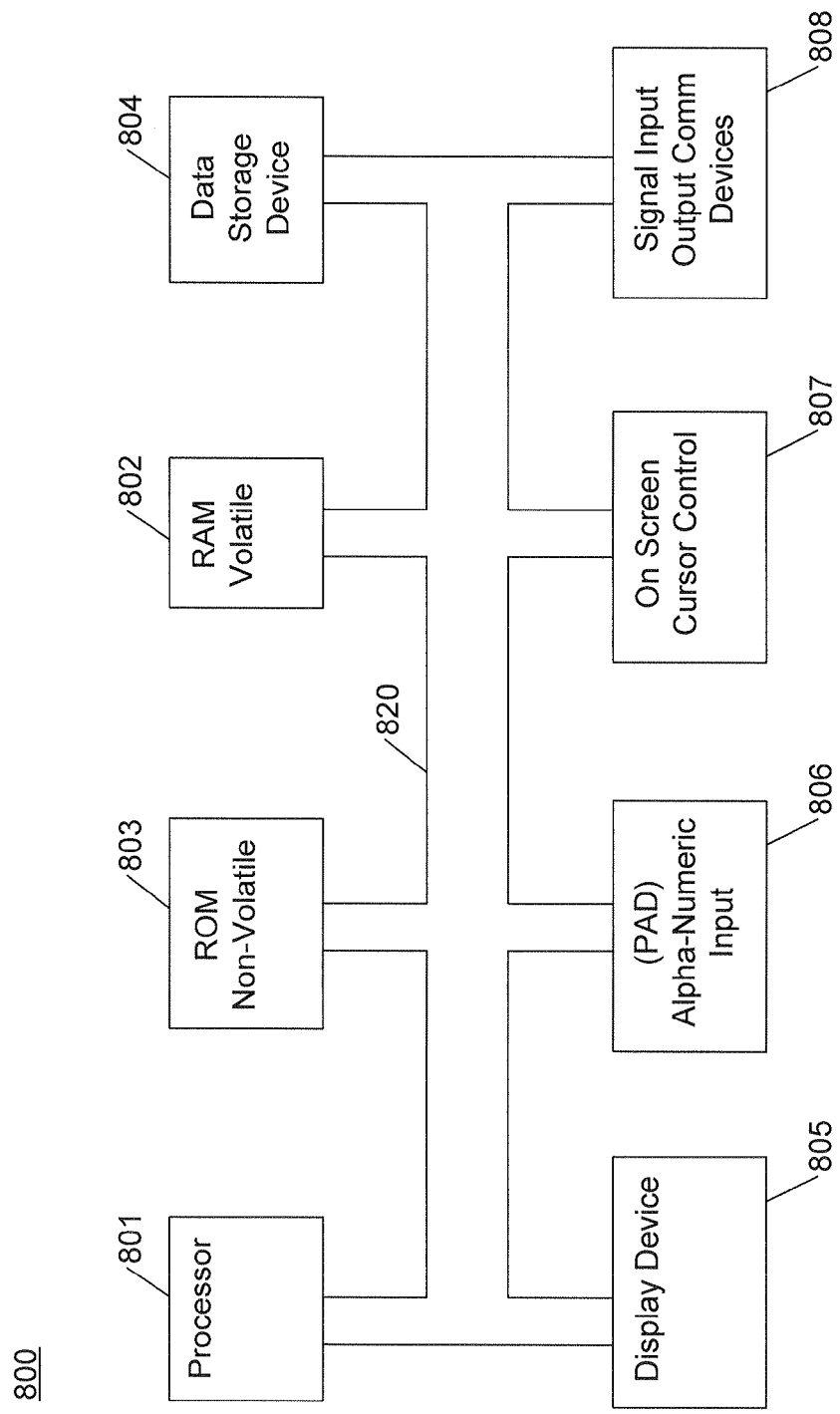
FIG. 8 is a diagram of an exemplary computer system that may serve as a platform for embodiments according to the present invention.

FIG. 8 is a diagram of an exemplary computer system 800 that may serve as a platform for embodiments according to the present invention. The exemplary computer system 800 can be used to implement the entire system 100 in FIG. 1. Moreover, the exemplary computer system 800 may be used to implement process 400 of FIGS. 4-6. FIG. 8 illustrates circuitry of host computer system 800, which may form a platform upon which to perform an embodiment of the present invention. Computer system 800 includes an address/data bus 820 for communicating information, a central processor 801 coupled with the bus for processing information and instructions, a volatile memory 802 (e.g., random access memory RAM) coupled with the bus 820 for storing information and instructions for the central processor 801 and a non-volatile memory 803 (e.g., read only memory ROM) coupled with the bus 820 for storing static information and instructions for the processor 801. Computer system 800 also includes a data storage device 804 coupled with the bus 820 for storing information and instructions. Data storage device 804 can be used to implement the database 140 of FIG. 1.

Also included in computer system 800 of FIG. 8 is an optional alphanumeric input device 806. Device 806 can communicate information and command selections to the central processor 801. System 800 also includes an optional cursor control or directing device 807 coupled to the bus 820 for communicating user input information and command selections to the central processor 801. The display device 805 utilized with the computer system 800 may be a liquid crystal device, cathode ray tube (CRT), field emission device (FED, also called flat panel CRT) or other display device suitable for creating graphic images and alphanumeric characters recognizable to the user. Signal communication device 808, also coupled to bus 820, can be a serial port.

The preferred embodiment of the present invention, a method and system for tracking entities in a computer network, is thus described. While the present invention has been described in particular embodiments, it should be appreciated that the present invention should not be construed as limited by such embodiments, but rather construed according to the below claims.

What is claimed is:

1. A method comprising:
   receiving node information for a node coupled to a computer network;
   analyzing the received node information to identify a unique identifier;
   selecting at least a security identified provided by an operating system of the node for the unique identifier when the analysis indicates that the node information includes the security identifier;
   selecting at least a serial number provided by a basic input output system of the node for the unique identifier when the analysis indicates that the node information does not include the security identifier;
   selecting at least a physical address for the unique identifier when the analysis indicates that the node information does not include either of the security identifier and the serial number;
   determining whether to issue an alarm indicating a network intrusion responsive to receiving the node information by comparing the unique identifier to a database;
   automatically linking at least a portion of said node information to an existing database entry in the database and not issuing the alarm when the comparison indicates a tracked entity that corresponds to the node; and
   issuing the alarm indicating the network intrusion and creating a new database entry when the comparison indicates that the node is a new entity.

2. The method of claim 1, wherein the unique identifier is not based solely on an Internet Protocol (IP) address such that the determination of whether the alarm is sent is independent of whether the node is subject to static or dynamic address assignment.

3. The method of claim 2, wherein the unique identifier is a combination of the physical address and a network address for the node.

4. The method of claim 1, wherein the unique identifier includes a domain name associated with the node, a computer name associated with the node and one other value associated with the node.

5. The method of claim 4, wherein the other value is a security identifier, a serial number or the physical address.

6. A method comprising:
   receiving node information for a node coupled to a computer network;
   selecting from the received node information a security identifier for use in a unique identifier when the security identifier is available, and when the security identifier is not available, selecting a substitute value for use in the unique identifier, the substitute value being at least one value selected from the group of a serial number, a physical address and another statically assigned value;
   determining whether to issue an alarm indicating a network intrusion responsive to receiving the node information by comparing the unique identifier to a database;

automatically linking at least a portion of said node information to an existing database entry in the database and not issuing the alarm when the comparison indicates a tracked entity that corresponds to the node; and issuing the alarm indicating the network intrusion and creating a new database entry when the comparison indicates that the node is a new entity.

7. The method of claim 6, wherein the unique identifier is a combination of the physical address and a network address for the node.

8. The method of claim 6, wherein said tracked entity is a user of said computer network.

9. The method of claim 6, wherein said tracked entity is a computer system.

10. An apparatus comprising:
one or more processors; and
a memory coupled to the processors comprising instructions executable by the processors, the processors operable when executing the instructions to:
receive node information for a node coupled to a computer network;
select from the received node information a security identifier for use in a unique identifier when the security identifier is available, and when the security identifier is not available, select a substitute value for use in the unique identifier, the substitute value being at least one value selected from the group of a serial number, a physical address and another statically assigned value;
determine whether to issue an alarm indicating a network intrusion responsive to receiving the node information by comparing the unique identifier to a database;
automatically link at least a portion of said node information to an existing database entry in the database and not issuing the alarm if the comparison indicates a tracked entity that corresponds to the node; and
issue the alarm indicating the network intrusion and create a new database entry if the comparison indicates that the node is a new entity.

11. The apparatus of claim 10 wherein the unique identifier is not based solely on an Internet Protocol (IP) address such that the node can be correlated to one of the tracked entities even when the node is subject to dynamic IP address assignment.

12. The apparatus of claim 10 wherein the substitute value is based on the serial number is unavailable.

13. The apparatus of claim 10 wherein the substitute value is based on the physical address for the node when a different preferred identifier is unavailable.

14. The apparatus of claim 10 wherein the substitute value is based on both the physical address and a network address for the node when a different preferred identifier is unavailable.

15. The apparatus of claim 10 wherein the unique identifier is a combination of a network address for the node and a globally unique identifier.

16. The apparatus of claim 10 wherein the unique identifier is not based solely on an IPv4 address such that the node can be correlated to one of the tracked entities even when the node is subject to dynamic IPv4 address assignment.

17. The apparatus of claim 10 wherein the processors are further operable to:
select either a security identifier provided by an operating system of the node if the received node information includes the operating system provided security identifier; and
select the substitute value if the received node information does not include the operating system provided security identifier.

18. The apparatus of claim 10 wherein issuance of a false alarm is avoided when the received node information is linked to an existing entry in the database.

19. The apparatus of claim 10 wherein the processors are further operable to use adaptive scanning before determining whether to issue the alarm.

20. A system, comprising:
means for receiving node information related to a node on said computer network;
means for selecting from the received node information a security identifier for use in a unique identifier when the security identifier is available, and if the security identifier is not available, selecting a substitute value for use in the unique identifier, the substitute value being at least one value selected from the group of a serial number, a physical address and another statically assigned value;
means for determining whether to issue an alarm indicating a network intrusion responsive to receiving the node information by comparing the unique identifier to a database;
means for linking at least a portion of said node information to an existing database entry in the database and not issuing the alarm if the comparison indicates a tracked entity that corresponds to the node; and
means for issuing the alarm indicating the network intrusion and creating a new database entry if the comparison indicates that the node is a new entity.

21. The system of claim 20, wherein said unique identifier is based on a computer name.

22. The system of claim 21, wherein said unique identifier is based on a domain name.

23. The system of claim 22, wherein said unique identifier is based on an operating system identifier.

24. The system of claim 20, wherein said serial number is associated with a Basic Input Output System for the node.

25. The system of claim 20, further comprising:
means for returning an identifier for an entity in response to a request including a node identifier.

26. The system of claim 20, further comprising:
means for returning identifiers for all nodes associated with an entity in response to a request including an entity identifier.

27. The system of claim 20, further comprising:
means for returning node information in response to a request for said node information including a node identifier.

* * * * *

UNITED STATES PATENT AND TRADEMARK OFFICE
CERTIFICATE OF CORRECTION

PATENT NO. : 7,398,310 B1  
APPLICATION NO. : 10/600856  
DATED : July 8, 2008  
INVENTOR(S) : Kuehl et al.

Page 1 of 1

It is certified that error appears in the above-identified patent and that said Letters Patent is hereby corrected as shown below:

Claim 12 at column 11, line 46, please replace "on the serial number" with --on the physical address for the node when the serial number--.

Signed and Sealed this

Sixteenth Day of June, 2009

JOHN DOLL  
*Acting Director of the United States Patent and Trademark Office*